| (12) | United States Patent | (10) Patent No.: | US 10,847,806 B2 |
|---|---|---|---|
| | Yang et al. | (45) Date of Patent: | Nov. 24, 2020 |

(54) ELECTROCHEMICAL DEVICE AND METHOD OF PREPARING THE SAME

(71) Applicant: Samsung Electronics Co., Ltd., Suwon-si, Gyeonggi-do (KR)

(72) Inventors: Hojung Yang, Suwon-si (KR); Kyounghwan Kim, Seoul (KR); Hwiyeol Park, Ansan-si (KR); Jin S. Heo, Hwaseong-si (KR); Sungjin Lim, Suwon-si (KR); Huisu Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 292 days.

(21) Appl. No.: 15/804,045

(22) Filed: Nov. 6, 2017

(65) Prior Publication Data

US 2018/0131004 A1     May 10, 2018

(30) Foreign Application Priority Data

Nov. 7, 2016 (KR) .................. 10-2016-0147630
Jan. 12, 2017 (KR) .................. 10-2017-0005229

(51) Int. Cl.

| H01M 4/78 | (2006.01) |
|---|---|
| H01M 10/04 | (2006.01) |
| H01M 10/052 | (2010.01) |
| H01M 10/058 | (2010.01) |
| H01M 4/04 | (2006.01) |

(Continued)

(52) U.S. Cl.

CPC .......... *H01M 4/78* (2013.01); *H01M 4/0445* (2013.01); *H01M 4/661* (2013.01); *H01M 10/0445* (2013.01); *H01M 10/052* (2013.01); *H01M 10/058* (2013.01); *H01M 10/0525* (2013.01); *H01M 2220/30* (2013.01)

(58) Field of Classification Search

None
See application file for complete search history.

(56) References Cited

U.S. PATENT DOCUMENTS

| 8,187,740 B2 | 5/2012 | Nathan et al. |
|---|---|---|
| 8,999,575 B2 | 4/2015 | Lee et al. |

(Continued)

FOREIGN PATENT DOCUMENTS

| EP | 3043409 A1 | 7/2016 |
|---|---|---|
| FR | 3007207 | 12/2013 |

(Continued)

*Primary Examiner* — Wyatt P McConnell
(74) *Attorney, Agent, or Firm* — Cantor Colburn LLP

(57) ABSTRACT

An electrochemical device including a positive electrode current collector; a first protruding portion including a plurality of positive electrodes in electrical contact with the positive electrode current collector, and a first dented portion disposed between each positive electrode of the plurality of positive electrodes; an electrolyte layer including a second protruding portion and a second dented portion respectively disposed on the first protruding portion including the plurality of positive electrodes and the first dented portion disposed between each positive electrode of the plurality of positive electrodes; and a negative electrode current collector layer including a third protruding portion and a third dented portion respectively disposed on the second protruding portion and the second dented portion of the electrolyte layer.

31 Claims, 8 Drawing Sheets

(51) Int. Cl.
*H01M 4/66* (2006.01)
*H01M 10/0525* (2010.01)

(56) References Cited

U.S. PATENT DOCUMENTS

| | | |
|---|---|---|
| 2004/0241540 A1 | 12/2004 | Tsutsumi et al. |
| 2014/0050969 A1 | 2/2014 | Rust, III et al. |
| 2016/0056503 A1* | 2/2016 | Shatunov .......... H01M 10/0567 429/338 |
| 2016/0141608 A1* | 5/2016 | Ryu ................... H01M 4/366 429/220 |
| 2016/0204464 A1 | 7/2016 | Cho et al. |
| 2016/0204477 A1* | 7/2016 | Yang ................... H01M 10/04 429/66 |

FOREIGN PATENT DOCUMENTS

| | | |
|---|---|---|
| JP | 2009105063 A | 5/2009 |
| KR | 1020120009703 A | 2/2012 |
| KR | 1020160085624 A | 7/2016 |
| KR | 1020160088126 A | 7/2016 |
| WO | 2013112135 A1 | 8/2013 |

* cited by examiner

ELECTROCHEMICAL DEVICE AND METHOD OF PREPARING THE SAME

CROSS-REFERENCE TO RELATED APPLICATIONS

This application claims the benefits of Korean Patent Application No. 10-2016-0147630, filed on Nov. 7, 2016, in the Korean Intellectual Property Office and Korean Patent Application No. 10-2017-0005229, filed on Jan. 12, 2017, in the Korean Intellectual Property Office, and all the benefits accruing therefrom under 35 U.S.C. § 119, the contents of which are incorporated herein by reference in their entirety.

BACKGROUND

1. Field

The present disclosure relates to an electrochemical device and a method of manufacturing the same.

2. Description of the Related Art

As technology in the field of electronics has developed, the market for various portable and wearable electronic devices has increased. Such portable and wearable electronic devices include cellular phones, game devices, portable multimedia players (PMP), MPEG audio layer-3 (MP3) players, smartphones, smart pads, e-readers, tablet computers, and mobile medical devices. Accordingly, with an increase in the demand for portable electronic devices, a demand for batteries appropriate for powering portable electronic devices has also increased.

Secondary batteries refer to batteries capable of charging and discharging, whereas primary batteries are not rechargeable. As a secondary battery, a lithium battery has a relatively higher voltage and a higher energy density per unit weight than a nickel-cadmium battery or a nickel-hydrogen battery. Thus, there is a need for an improved lithium secondary battery which may be used in portable/wearable electronic devices

SUMMARY

For the purpose of increasing the capacity of a lithium secondary battery, lithium secondary batteries including electrodes having a three-dimensional (3D) structure have been developed.

Provided is an electrochemical device that includes a negative electrode current collector layer that may effectively withstand volume changes which occur in the electrochemical device during charging and discharging cycles; and a positive electrode having a composition that improves the uniformity of a thickness of a lithium negative electrode.

According to an aspect of an embodiment, an electrochemical device includes:
a positive electrode current collector;
a first protruding portion including a plurality of positive electrodes in electrical contact with the positive electrode current collector, and a first dented portion disposed between each positive electrode of the plurality of positive electrodes;
an electrolyte layer including a second protruding portion disposed on the first protruding portion and a second dented portion disposed on the first dented portion; and
a negative electrode current collector layer including a third protruding portion and a third dented portion respectively disposed on the second protruding portion and the second dented portion of the electrolyte layer.

According to an aspect of another embodiment, an electrochemical device includes:
a positive electrode current collector;
a plurality of positive electrodes in contact with the positive electrode current collector;
an electrolyte layer in contact with the plurality of positive electrodes; and
a negative electrode current collector layer disposed along a contour of a surface of the electrolyte layer.

According to an aspect of still another embodiment, an electrochemical device includes:
a positive electrode current collector;
a positive electrode in contact with the positive electrode current collector and including a positive active material and a compound including an active metal, wherein an initial charge and discharge efficiency of the compound including the active metal is lower than an initial charge and discharge efficiency of the positive active material;
an electrolyte layer in contact with the positive electrode; and
a negative electrode current collector layer in contact with the electrolyte layer.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
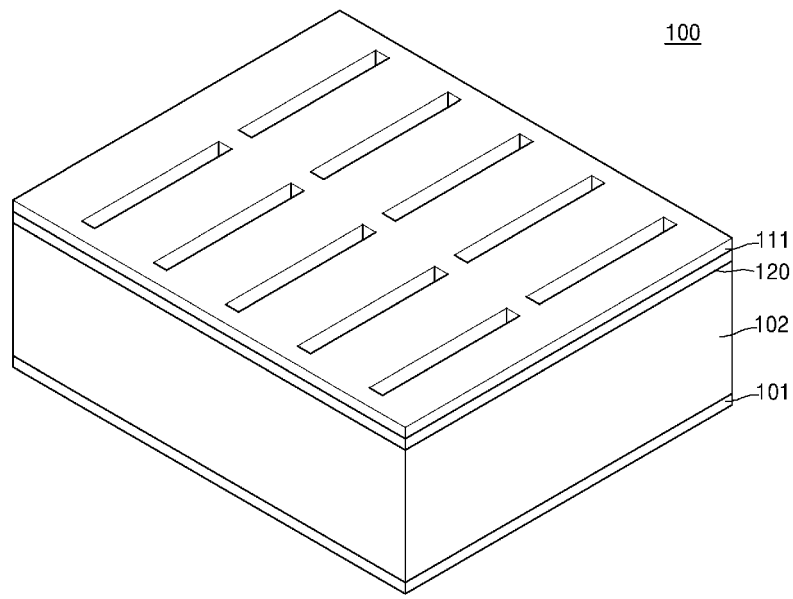
FIG. 1 is a perspective view of an embodiment of a structure of an electrochemical device.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

Like reference numerals in the drawings denotes like components, and sizes of components in the drawings may be exaggerated for clarity and convenience of explanation. In addition, embodiments described herein are for illustrative purposes only, and various changes in form and details may be made therein. It will be understood that when a component is referred to as being "on the top of" or "on" another component, the component can be directly on the other component or indirectly thereon. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, with reference to the attached drawings, embodiments of an electrochemical device and a method of preparing the electrochemical device will be described in further detail.

Figure 2:
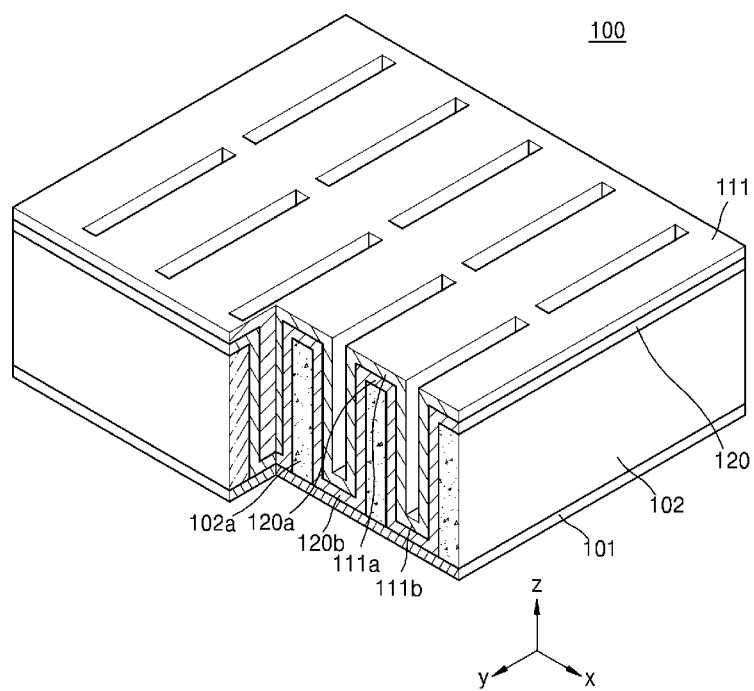
FIG. 2 is a partial perspective view showing the electrochemical device illustrated in FIG. 1.
Figure 3:
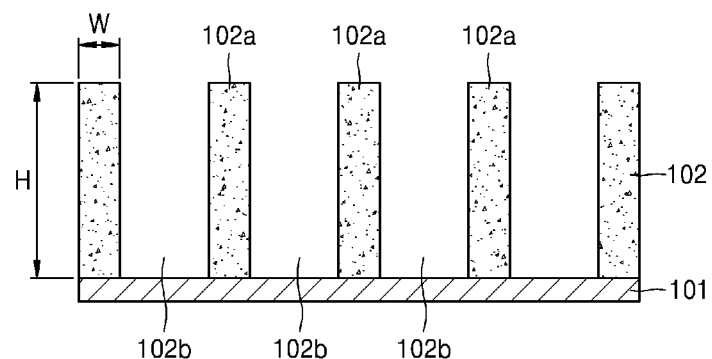
FIG. 3 is a partial cross-sectional view of the electrochemical device illustrated in FIG. 1.
Figure 4A:
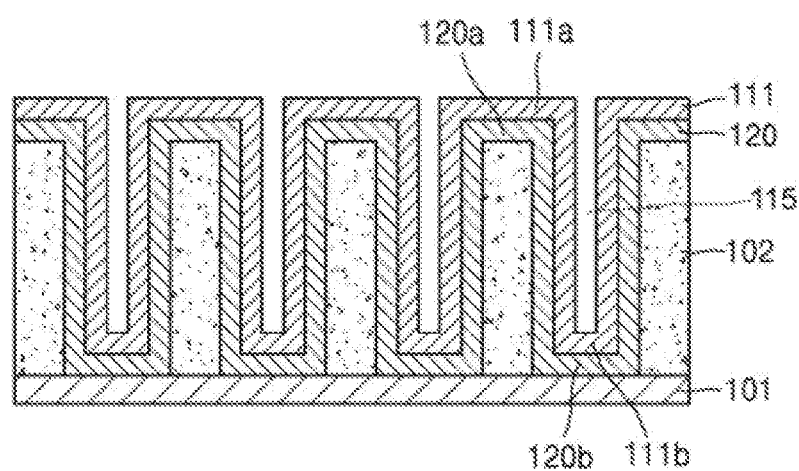
FIG. 4A is a cross-sectional view of the electrochemical device illustrated in FIG. 1.

FIG. 1 is a perspective view of an embodiment of a structure of an electrochemical device. FIG. 2 is a partial perspective view showing the electrochemical device illustrated in FIG. 1. FIG. 3 is a partial cross-sectional view of the electrochemical device illustrated in FIG. 1, in which only a positive electrode current collector and a positive electrode of the electrochemical device are illustrated, and in which other parts thereof are omitted for convenience of description. FIG. 4A is a cross-sectional view of the electrochemical device illustrated in FIG. 1.

Referring to FIG. 1 to FIG. 4A, an electrochemical device 100 according to one or more embodiments may include a positive electrode current collector 101, a plurality of positive electrodes 102, an electrolyte layer 120, and a negative electrode current collector layer 111. The plurality of positive electrodes 102 may be in electrical contact with the positive electrode current collector 101 and may be disposed in a direction (e.g., a z-direction illustrated in FIG. 2) protruding from the positive electrode current collector 101. A first protruding portion 102*a*, includes each positive electrode of the plurality of positive electrodes 102, and a first dented portion 102*b* is disposed between each positive electrode of the plurality of positive electrodes 102. As used herein, the term "dented" is used to refer to a non-protruding structure, such as a recess or notch (e.g., an indentation), regardless of how it is formed. The electrolyte layer 120 may include a second protruding portion 120*a* and a second dented portion 120*b* which are respectively disposed on the first protruding portion 102*a* including each positive electrode of the plurality of positive electrodes 102 and the first dented portion 102*b* disposed between the plurality of positive electrodes 102. The negative electrode current collector layer 111 may include a third protruding portion 111*a* and a third dented portion 111*b* respectively disposed on the second protruding portion 120a and the second dented portion 120b of the electrolyte layer 120.

Referring to FIG. 4A, a hollow space 115 may be defined between a plurality of third protruding portions 111a by the third dented portion 111b. This hollow space 115 may effectively withstand volume changes which occur within the electrochemical device 100 during charging and discharging of the electrochemical device 100. For example, this hollow space may effectively withstand volume changes of a negative electrode 112 (illustrated in FIG. 5) during charging and discharging of the electrochemical device 100, thereby preventing deterioration which may occur, such as cracking of the electrochemical device 100. Consequently, the electrochemical device 100 may have improved lifespan characteristics and improved stability.

Figure 4B:
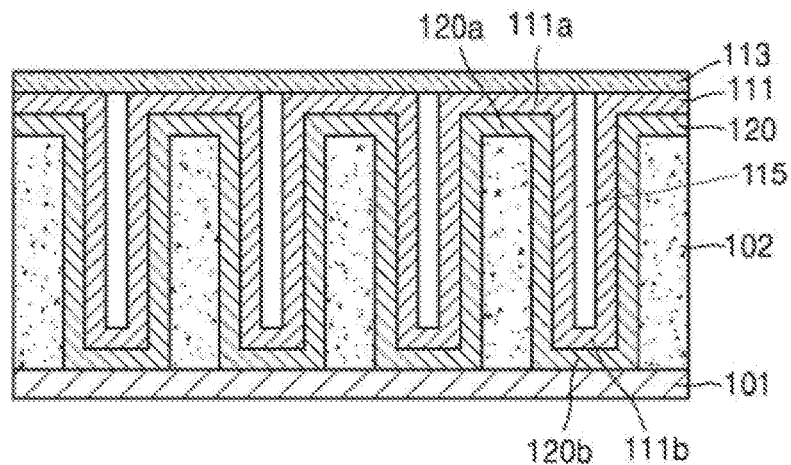
FIG. 4B is a cross-sectional view of another embodiment of an electrochemical device.

Referring to FIG. 4B, a negative electrode current collector 113 in sheet form may be further disposed on the negative electrode current collector layer 111. The hollow space 115 formed between the plurality of third protruding portions 111a by the third dented portion 111b may be enclosed by the negative electrode current collector 113 in sheet form. The hollow space 115 may be filled with an inert gas such as nitrogen or argon, but the composition of the inert gas is not limited thereto. Any suitable gas may be used, provided that the gas does not participate in electrochemical reactions and does not deteriorate a battery. The pressure within the hollow space 115 may be atmospheric pressure (1 atm) or lower than 1 atm. The negative electrode current collector 113 in sheet form may be a metal foil or the like, but embodiments of the negative electrode current collector 113 are not limited thereto. Any suitable electrically conductive material may be used that may be formed in sheet form by using an electrically conductive slurry or sputtering.

Figure 4C:
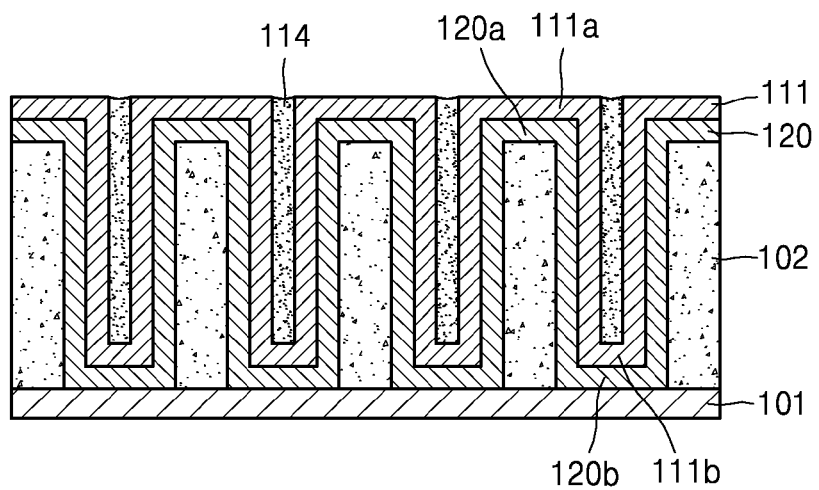
FIG. 4C is a cross-sectional view of still another embodiment of an electrochemical device.

Referring to FIG. 4C, the hollow space that may be defined between the plurality of third protruding portions 111a by the third dented portion 111b may be filled with a buffer layer 114. The buffer layer 114 may effectively withstand a volume increase in the negative electrode 112 which may occur during charging of the electrochemical device 100. With further regard to a volume decrease of the negative electrode 112 during discharging of the electrochemical device 100, the buffer layer 114 may facilitate restoration of the negative electrode current collector layer 111 to its original form before charging, thereby preventing deterioration which may occur, such as cracking of the electrochemical device 100.

The composition of the buffer layer 114 may include an elastic material capable of easily changing its volume in response to an external force. The elastic material may include, for example, a natural rubber, a synthetic rubber, or a combination thereof. Examples of the synthetic rubber may include styrene-butadiene rubber (SBR), butadiene rubber (BR), isoprene rubber (IR), ethylene-propylene diene monomer (EPDM) rubber, silicon rubber, an alkyl acrylate copolymer, a styrene-ethylene-butadiene-styrene copolymer, a polymethylsilane rubber, a butyl acrylate copolymer, or a combination thereof, but embodiments of the synthetic rubber are not limited thereto. Any synthetic rubber capable of changing its volume in response to an external force may be used as the elastic material. The elastic material may further include a conductive agent. The conductive agent may be a carbonaceous conductive agent and/or a metallic conductive agent. Non-limiting examples of the conductive agent include carbon black, graphite (e.g., graphite particulates, natural graphite, artificial graphite), acetylene black, Ketjen black, carbon fibers, carbon nanotubes, metallic materials, such as copper, nickel, aluminum, or silver, in powder, fiber, or tube form, a conductive polymer, such as a polyphenylene derivative, or a combination thereof. The conductive agent is not particularly limited, and any suitable conductive agent available may be used.

At least one portion of the buffer layer 114 may be hollow (empty). That is, a portion of the buffer layer 114 may include an elastic material, while another portion thereof may be hollow. A volume of the portion including an elastic material may be about 90 percent by volume (volume %) or less, about 70 volume % or less, about 50 volume % or less, about 30 volume % or less, about 20 volume %, or about 10 volume % or less, based on the total volume of the buffer layer 114, while the remaining portion which does not include the elastic material may be empty (hollow). The elastic material in the buffer layer 114 may be a porous elastic material. Because the buffer layer 114 includes the porous elastic material, the buffer layer 114 may more readily withstand volume changes which occur during charging and discharging of the electrochemical device 100.

Referring to FIGS. 1 and 4A to 4C, in the negative electrode current collector layer 111, the third protruding portion 111a and the third dented portion 111b may be regularly or periodically arranged and disposed parallel to each other. As used herein, "regularly arranged" refers to an arrangement in which a distance between third protruding portions or third dented portions is substantially the same, while the term "periodically arranged" refers to an arrangement in which a distance between third protruding portions or third dented portions is different, for example, irregular or intermittent. The regular or periodical arrangement of the plurality of third protruding portions 111a and the plurality of third dented portions 111b may enhance structural uniformity of the electrochemical device 100, thereby leading to prevention of deterioration in the electrochemical device 100.

Referring to FIGS. 2 and 4A to 4C, in the negative electrode current collector layer 111, the third dented portion 111b may include a first side surface and a second side surface spaced apart from and facing each other, and a bottom surface. An angle between each of the first side surface and the second side surface of the third dented portion 111b and the bottom surface of the third dented portion 111b may be about 60 degrees or greater, about 65 degrees or greater, about 70 degrees or greater, about 75 degrees or greater, about 80 degrees or greater, about 85 degrees or greater, or about 80 degrees to about 100 degrees.

A distance (or interval) between the side surfaces of the third dented portion 111b that are facing each other may be in a range of about 5 micrometers ($\mu$m) to about 30 $\mu$m, about 6 $\mu$m to about 25 $\mu$m, about 7 $\mu$m to about 20 $\mu$m, or about 8 $\mu$m to about 18 $\mu$m.

A depth of the third dented portion 111b, i.e., a distance from a surface of the electrochemical device 100 to the bottom surface of the third dented portion 111b, may be in a range of about 60 $\mu$m to about 300 $\mu$m, about 80 $\mu$m to about 250 $\mu$m, about 100 $\mu$m to about 230 $\mu$m, or about 120 $\mu$m to about 200 $\mu$m.

Since the third dented portion 111b has an angle, a distance (interval), and a depth as such, the electrochemical device 100 may have improved structural stability and energy density, thus realizing increased discharge capacity even at the same size of volume thereof.

A thickness of the negative electrode current collector layer 111 may be about 5 $\mu$m or less, about 4.5 $\mu$m or less, about 4.0 $\mu$m or less, about 3.5 $\mu$m or less, about 3.0 $\mu$m or less, about 2 $\mu$m or less, about 1 $\mu$m or less, about 0.5 $\mu$m or less, or about 0.1 µm or less, and about 0.01 µm or greater or about 0.05 µm or greater. When the thickness of the negative electrode current collector layer 111 is about 5 µm or less, a weight fraction of a current collector in the electrochemical device 100 is decreased. Thus, energy density per unit weight of the electrochemical device 100 may be increased.

In the negative electrode current collector layer 111, the plurality of third protruding portions 111a and the plurality of third dented portions 111b may be electrically connected to each other, and this electrical connection may be maintained after about 100 or more cycles of charging and discharging. After more than 100 cycles of charging and discharging, a surface resistance of the negative electrode current collector layer 111 may be about 101% or less, about 104% or less, about 105% or less, about 110% or less, or about 120% or less of an initial surface resistance before the cycles of charging and discharging.

Referring to FIGS. 1 to 4C, the positive electrode 102 may include a compound containing an active metal and having an initial charge and discharge efficiency lower than that of a positive active material. The compound containing an active metal may be uniformly distributed throughout the positive electrode 102 or may be localized in a portion thereof. For example, the compound containing an active metal may primarily be located in the positive electrode 102 at a position adjacent to the electrolyte layer 120. The positive electrode may include the compound containing an active metal and/or an oxidation product thereof.

At an initial charge step, in the positive electrode 102, the compound containing an active metal may be oxidized and separated into active metal ions, electrons, and an oxidation product of the compound containing an active metal. The active metal ions may move from the positive electrode 102 to the electrolyte layer 120, and the electrons may move from the positive electrode 102 through the positive electrode current collector 101 and an external circuit to the negative electrode current collector layer 111. The active metal ions may then be reduced by the electrons, and may be electroplated between the negative electrode current collector layer 111 and the electrolyte layer 120, thereby forming an active metal bed such as a lithium bed. At a subsequent initial discharge step, the active metal in the active metal bed may be oxidized and separated into active metal ions and electrons. The active metal ions may move from the active metal bed to the electrolyte layer 120, and the electrons may move from the active metal bed to the positive electrode current collector 101 via the negative electrode current collector layer 111 and the external circuit. The oxidation product of the compound containing an active metal may then be reduced by the active metal ions and the electrons in the positive electrode 102 to thereby again form the compound containing an active metal. Since the initial charge and discharge efficiency of the compound containing an active metal is relatively low, only a portion of active metal ions used in forming the active metal bed at an initial charge step may return to the positive electrode 102 during the discharge step. Thus, a portion of the active metal bed may remain as the negative electrode 112, and a portion of the oxidation product of the compound containing an active metal may remain in the positive electrode 102. Initially, the positive electrode 102 may only include the compound containing an active metal. After initial charging and discharging, the positive electrode 102 may additionally include the oxidation product of the compound containing an active metal.

Figure 5:
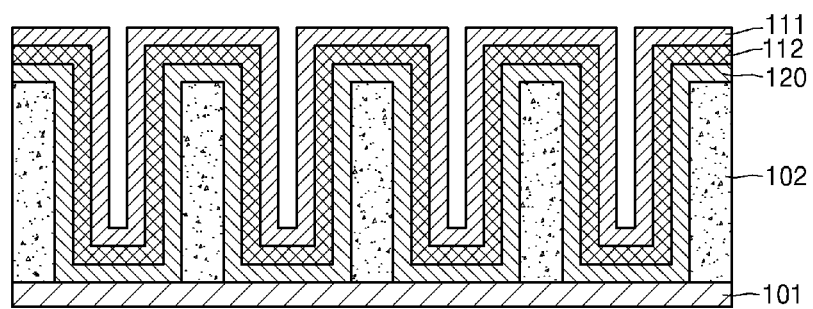
FIG. 5 is a cross-sectional view of still yet another embodiment of an electrochemical device.

As a result, after initial charging and discharging, the negative electrode 112 may be formed between the negative electrode current collector layer 111 and the electrolyte layer 120 as illustrated in FIG. 5. As such, the negative electrode 112 may be disposed between the negative electrode current collector layer 111 and the electrolyte layer 120 so as to have a uniform thickness, unlike a negative electrode disposed by an alternative method, e.g., a deposition method. Thus, the negative electrode 112 may be prevented from having an uneven thickness which could result in a reduction in the capacity of the electrochemical device 100 and collapse of the electrode structure during charging and discharging of the electrochemical device 100. Accordingly, lifespan characteristics and stability of the electrochemical device 100 may improve.

An initial charge and discharge efficiency of the compound containing an active metal may be about 50% or less. In this case, only about 50% or less of the active metal electroplated between the negative electrode current collector layer 111 and the electrolyte layer 120 may be oxidized upon discharge, and the rest of active metal may remain unoxidized. Accordingly, the negative electrode 112 may be formed. In the electrochemical device 100, an initial charge and discharge efficiency of the compound containing an active metal may be about 45% or less, about 40% or less, about 35% or less, about 30% or less, about 25% or less, about 20% or less, about 15% or less, or about 10% or less.

The compound containing an active metal may include $Li_3N$, $Li_2NiO_2$, $Li_2MnO$, or a combination thereof, but embodiments of the compound are not limited thereto. Any compound in the art which is suitable for use in an electrochemical device and which contains an active metal having an initial charge and discharge efficiency lower than that of a positive active material, may be used.

An amount of the compound containing an active metal may be about 10% or less, about 5% or less, about 3% or less, or about 0.5% or less, based on the total weight of the positive electrode 102. When an amount of the compound containing an active metal is excessively large, an amount of a positive active material may be reduced, and thus capacity of the electrochemical device 100 may decrease. When an amount of the compound containing an active metal is excessively small, only a small amount of the active metal bed may be formed, and thus it may be difficult to obtain a negative electrode having a uniform thickness.

Figure 6:
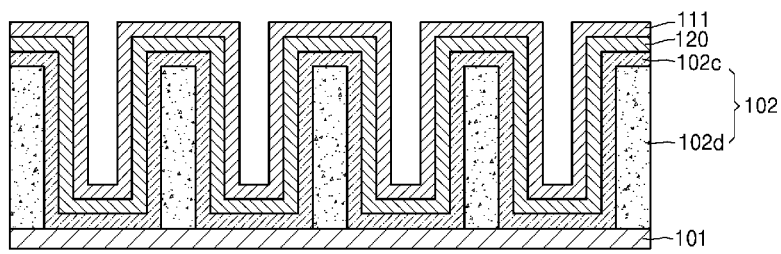
FIG. 6 is a cross-sectional view of still yet another embodiment of an electrochemical device.

Referring to FIG. 6, the positive electrode 102 may include an irreversible layer 102c in contact with the electrolyte layer 120, and a reversible layer 102d in contact with the positive electrode current collector 101. The irreversible layer 102c may include the compound containing an active metal. The reversible layer 102d may be disposed between a portion of the irreversible layer 102c and the positive electrode current collector 101, and may include a positive active material. That is, the positive electrode 102 may have a multi-layered structure including the irreversible layer 102c and the reversible layer 102d. The irreversible layer 102c may also be referred to as a sacrificial layer because, during charging or discharging, a portion of or all of the compound containing an active metal may be removed by oxidation. After initial charging and discharging, an oxidation product of the compound containing an active metal may remain in a region of the irreversible layer 102c. The negative electrode 112 (see FIG. 5) may be formed and the thickness thereof may increase between the electrolyte layer 120 and the negative electrode current collector layer 111, in proportion to a degree of reduction of the irreversible layer 102c.

A thickness of the irreversible layer 102c may be about 30% or less, about 15% or less, about 9% or less, or about 4% or less, based on the total thickness of the irreversible layer 102c and the reversible layer 102d of the positive electrode 102. When the irreversible layer 102c is excessively thick, an amount of a positive active material in the positive electrode may be reduced due to the corresponding decreased thickness of the reversible layer 102d, and thus capacity of the electrochemical device 100 may decrease. When the irreversible layer 102c is excessively thin, only a small amount of the active metal bed may be formed, and thus it may be difficult to obtain a negative electrode having a uniform thickness. A thickness of the irreversible layer 102c may be about 200 nanometers (nm) or less, about 150 nm or less, about 100 nm or less, or about 50 nm or less. When a thickness of the irreversible layer 102c is greater than about 200 nm, an amount of a positive active material in the positive electrode may be reduced, and a resistance may increase.

Referring to FIGS. 2 to 6, in the electrochemical device 100, the plurality of positive electrodes 102 may be disposed on the positive electrode current collector 101 so as to be spaced apart from one another in a direction horizontal to the positive electrode current collector 101 in flat panel form, and may extend from the surface of the positive electrode current collector 101 in a direction which is vertical (perpendicular) to the surface of the positive electrode current collector 101. An angle between the positive electrode 102 and the positive electrode current collector 101 may be in a range of about 60 degrees to about 120 degrees, about 70 degrees to about 110 degrees, about 80 degrees to about 100 degrees, or about 85 degrees to about 95 degrees. An aspect ratio of a height H to a width W of a cross-section of the positive electrode 102 may be about 5 or greater, about 10 or greater, about 20 or greater, about 30 or greater, about 40 or greater, or about 50 or greater. Since the positive electrode 102 is in flat panel form, a contact area between the positive electrode 102 and the electrolyte layer 120 may increase, and a distance for the active metal ions to migrate to the electrolyte layer 120 may decrease, so that the electrochemical device 100 may have a decreased internal resistance, an increased energy density, and improved high-rate characteristics.

A height (i.e., the height H illustrated in FIG. 3) of the positive electrode 102 may be about 10 μm or greater. A height of the positive electrode 102 may be in a range of about 10 μm to about 5 millimeters (mm), about 10 μm to about 1 mm, about 50 μm to about 1 mm, about 100 μm to about 500 μm, about 100 μm to about 400 μm, or about 100 μm to about 300 μm. When the height H of the positive electrode 102 is excessively low, the energy density of the electrochemical device 100 may decrease, whereas when the height H of the positive electrode 102 is excessively high, the structural stability of the electrochemical device 100 may decrease. A width (i.e., the width W illustrated in FIG. 3) of the positive electrode 102 may be about 100 μm or less. A thickness of the positive electrode 102 may be about 50 μm or less, about 40 μm or less, about 30 μm or less, about 20 μm or less, about 10 μm or less, or about 5 μm or less, and about 0.01 μm or greater. As a thickness of the positive electrode 102 decreases, the distance for the active metal ions to migrate to the electrolyte layer 120 may also decrease, so that the electrochemical device 100 may have a decreased internal resistance and improved high-rate characteristics.

Although not illustrated in the drawings, a conductive adhesive layer may additionally be disposed between the positive electrode 102 and the positive electrode current collector 101. The conductive adhesive layer may facilitate bonding between the positive electrode 102 and the positive electrode current collector 101 and thereby electrically connect them to each other, and the conductive adhesive layer may be formed using a conductive adhesive or a conductive paste.

Figure 7:
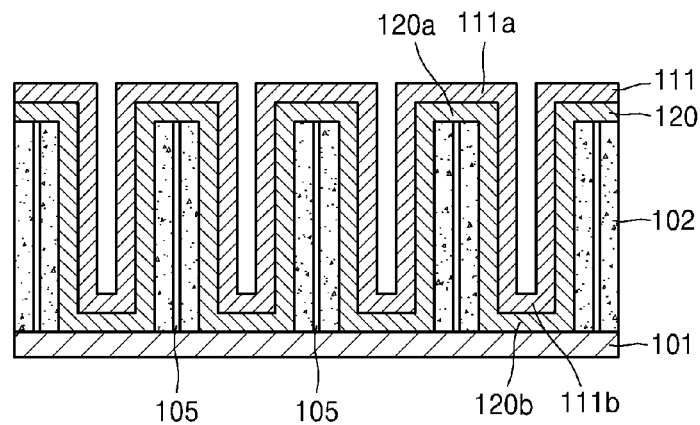
FIG. 7 is a cross-sectional view of still yet another embodiment of an electrochemical device.

Referring to FIG. 7, the electrochemical device 100 may additionally include a positive conductor layer 105 in electrical contact with the positive electrode current collector 101 and which may be inserted in the positive electrode 102. The positive conductor layer 105 and the positive electrode current collector 101 may be prepared using different materials and then adhered to each other. Alternatively, the positive conductor layer 105 and the positive electrode current collector 101 may be prepared as a single body using the same electrically conductive material. For example, the positive electrode current collector 101 may have a plurality of positive conductor layers 105 extending in a perpendicular direction from a surface thereof. In FIG. 7, the positive conductor layer 105 is illustrated in flat panel form; however, the positive conductor layer 105 may not be in flat panel form, and may be in any form suitable for a conductor layer. For example, the positive conductor layer 105 may be in fishbone form, mesh form, or lattice form.

The positive conductor layer 105 may extend from the positive electrode current collector 101 to the electrolyte layer 120 to thereby be in contact with the electrolyte layer 120. The positive conductor layer 105 may extend from the positive electrode current collector 101 to the electrolyte layer 120, thereby facilitating migration of electrons to end portions of the positive electrode 102. In some embodiments, the positive conductor layer 105 may extend from the positive electrode current collector 101 toward the electrolyte layer 120, but may not make contact with the electrolyte layer 120. The positive conductor layer 105 may optionally be inserted into only some of or all of the plurality of positive electrodes 102, and the inserted positive conductor layer 105 may be in different forms. When the positive electrode 102 has high electronic conductivity, the positive conductor layer 105 may be omitted. A thickness of the positive conductor layer 105 may be about 3 μm or less, about 2 μm or less, about 1 μm or less, about 0.5 μm or less, or about 0.3 μm or less, and about 0.1 μm or greater.

Figure 8:
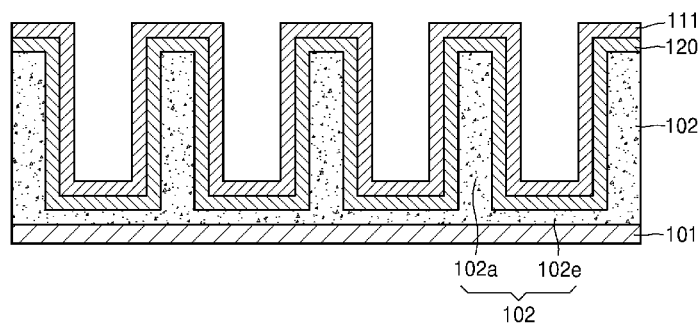
FIG. 8 is a cross-sectional view of still yet another embodiment of an electrochemical device.

Referring to FIGS. 3 and 8, the electrochemical device 100 may further include a supporting portion 102e. The supporting portion 102e may be disposed under the first dented portion 102b and between adjacent first protruding portions of the plurality of first protruding portions 102a. The supporting portion 102e may be in contact with the first protruding portion 102a to support the first protruding portion 102a, wherein the plurality of first protruding portions 102a constitute the plurality of positive electrodes 102. The supporting portion 102e may improve structural stability of the positive electrode 102 disposed in a direction protruding (extending) from the positive electrode current collector 101, and may have the same composition as the positive electrode 102. The supporting portion 102e and the first protruding portion 102a may be formed as a single body.

Figure 9:
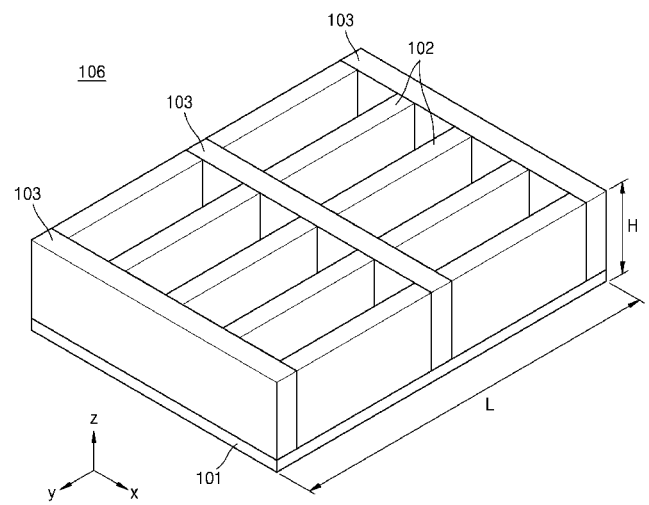
FIG. 9 is a perspective view of a module of an electrochemical device.

Referring to FIG. 9, the electrochemical device may include a module 106 including the plurality of positive electrodes 102. The module 106 has a structure in which the plurality of positive electrodes 102, spaced apart from one another, may be supported by a supporter. Types of the supporter are not particularly limited. For example, the supporter may be a barrier rib 103 that may support a side surface of the module 106, or may be the positive electrode current collector 101 that supports a bottom surface of the module 106. Although not illustrated in FIG. 9, an electrolyte layer and a negative electrode current collector layer may be sequentially stacked to form the electrochemical device 100. A negative electrode may further be included between the electrolyte layer and the negative electrode current collector layer.

Referring to FIG. 9, a height of the module 106 may be in a range of about 10 μm to about 5 mm, about 10 μm to about 1 mm, about 50 μm to about 1 mm, about 100 μm to about 500 μm, about 100 μm to about 400 μm, or about 100 μm to about 300 μm. The module 106 may include at least one barrier rib 103 (e.g., partition) in contact with the positive electrode 102 in a direction perpendicular to the positive electrode 102. In the module 106, the barrier rib 103 may be disposed in an x-direction which is perpendicular to the positive electrode 102 disposed in a y-direction. The barrier rib 103 may support both sides of the positive electrode 102, so during charging and discharging of the electrochemical device 100, the module 106 may be prevented from being deformed and deteriorated due to expansion and/or shrinkage of the positive electrode 102. A length L of the module 106 may be in a range of about 20 μm to about 100 mm, about 20 μm to about 50 mm, about 20 μm to about 10 mm, about 100 μm to about 10 mm, about 200 μm to about 5,000 μm, about 200 μm to about 4,000 μm, or about 200 μm to about 3,000 μm. The barrier rib 103 may have a composition that is the same as, or different from, the composition of the positive electrode 102.

The positive electrode current collector 101 may be in flat sheet form. A thickness of the positive electrode current collector 101 may be about 30 μm or less, about 20 μm or less, about 10 μm or less, about 5 μm or less, about 3 μm or less, or in a range of about 0.01 μm to about 30 μm. As shown in FIG. 9, the module 106 may include the barrier rib 103 as a supporter. Alternatively, the module may not include the barrier rib and may include only the positive electrode current collector 101 as a supporter.

As shown in FIG. 5, the negative electrode 112 may be disposed between the negative electrode current collector layer 111 and the electrolyte layer 120. The negative electrode 112 may be formed between the negative electrode current collector layer 111 and the electrolyte layer 120 during charging and discharging of the electrochemical device 100 as described above; however, the method of forming the negative electrode 112 is not limited thereto. For example, the negative electrode 112 may be disposed on the electrolyte layer 120 by deposition, for example, by physical vapor deposition (PVD). In this case, the negative electrode 112 may first be disposed by deposition thereof to a small thickness, and then the thickness of the negative electrode 112 may subsequently increase during charging and discharging of the electrochemical device 100.

The negative electrode 112 may be a conformal layer which conforms to a contour of the electrolyte layer. In other words, the negative electrode 112 may have a layer formed along a contour of a surface of the electrolyte layer 120.

In addition, the negative electrode 112 may have a high side step coverage (SCs). The negative electrode 112 may be disposed between the negative electrode current collector layer 111 and the electrolyte layer 120 upon initial charging and discharging, or in some embodiments, the negative electrode 112 may be disposed first by deposition thereof to a small thickness, and then a thickness of the negative electrode 112 may increase during charging and discharging. Thus, the negative electrode 112 may have a high SCs.

Figure 10:
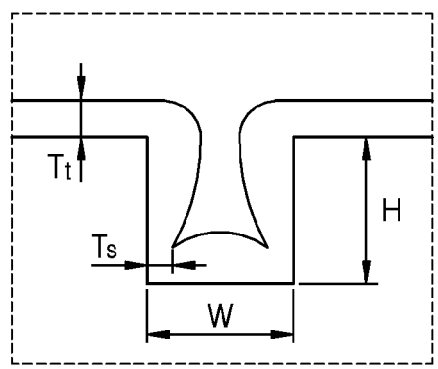
FIG. 10 is a cross-sectional view showing side step coverage.

Referring to FIG. 10, "Ts" represents a thickness at the thinnest point in the height of the step, "Tt" represents a thickness of a flat surface in the step, "H" represents a height of the step, and "W" represents a width of the step. An SCs of the negative electrode 112 may be calculated by the following Equation 1, and the SCs may be about 50% or greater, about 60% or greater, about 70% or greater, about 80% or greater, about 90% or greater, about 95% or greater, or about 99% or greater.

$$SCs = Ts/Tt \times 100\% \qquad \text{Equation 1}$$

In Equation 1, "Ts" represents a thickness at the thinnest point in the height of the step and "Tt" represents a thickness of a flat surface in the step.

The negative electrode 112 may include lithium, an active metal alloyable with lithium, sodium, an active metal alloyable with sodium, or a combination thereof. A thickness of the negative electrode 112 may be about 3 μm or less, about 2 μm or less, or about 1 μm or less. For example, a thickness of the negative electrode 112 may be in a range of about 0.01 μm to about 3 μm, about 0.05 μm μm to about 3 μm, or about 0.1 μm to about 3 μm.

Referring to FIG. 5, the positive electrode 102 and the negative electrode 112 are not in direct contact with each other, but the positive electrode 102 and the negative electrode 112 may be capable of exchanging metal ions with each other through the electrolyte layer 120. The metal ions that the electrolyte layer 120 transfers may be lithium ions or sodium ions. The positive electrode current collector 101 may be electrically connected to the positive electrode 102, and the negative electrode current collector layer 111 may be electrically connected to the negative electrode 112. A thickness of the electrolyte layer 120 may be about 20 μm or less, about 15 μm or less, about 10 μm or less, about 5 μm or less, about 4 μm or less, about 3 μm or less, about 2 μm or less, about 1 μm or less, about 0.5 μm or less, or about 0.1 μm or less, and about 0.01 μm or greater. As the thickness of the electrolyte layer 120 decreases, the distance for ions to migrate from the positive electrode 102 to the negative electrode 112 may decrease, so that the electrochemical device 100 may have a decreased internal resistance and improved high-rate characteristics. In addition, when the electrolyte layer 120 included in the electrochemical device 100 is a solid electrolyte, the electrochemical device 100 may not encounter problems such as leakage or ignition of an electrolytic solution, thus improving the stability thereof. The electrochemical device 100 may be manufactured in small sizes, and thus, the electrochemical device 100 may easily be used as batteries in small devices, such as mobile devices or wearable devices. The electrochemical device 100 may be, for example, used in cell phones, glasses, healthcare bands, or wrist watches.

The electrochemical device 100 may be a lithium battery. The positive electrode current collector 101 and the negative electrode current collector layer 111 may include, for example, an electrically conductive metal, such as copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), palladium (Pd), or a combination thereof. However, embodiments are not limited thereto, and any suitable current collector may be used. The positive electrode current collector 101 may be, for example, an aluminum foil. The negative electrode current collector layer 111 may be, for example, a copper foil.

In lithium batteries, the positive active material is not particularly limited, and any suitable positive active material for lithium batteries may be used. The positive active material may be a compound capable of reversible intercalation and deintercalation of lithium (i.e., a lithiated intercalation compound). The positive active material may include lithium cobalt oxide, lithium nickel cobalt manganese oxide, lithium nickel cobalt aluminum oxide, lithium iron phosphorous oxide, lithium manganese oxide, or a combination thereof. For example, the positive active material may include a lithium cobalt oxide such as $LiCoO_2$; a lithium nickel oxide such as $LiNiO_2$; a lithium manganese oxide such as $Li_{1+x}Mn_{2-x}O_4$ (wherein x is from 0 to 0.33); a lithium manganese oxide such as $LiMnO_3$, $LiMn_2O_3$, or $LiMnO_2$; a lithium copper oxide such as $Li_2CuO_2$; a lithium iron oxide such as $LiFe_3O_4$; a lithium vanadium oxide such as $LiV_3O_8$; a copper vanadium oxide such as $Cu_2V_2O_7$; a vanadium oxide such as $V_2O_5$; a lithium nickel oxide such as $LiNi_{1-x}M_xO_2$ (wherein M may be selected from Co, Mn, Al, Cu, Fe, Mg, B, and Ga, and x is from 0.01 to 0.3); a lithium manganese composite oxide such as $LiMn_{2-x}M_xO_2$ (wherein M may be at selected from Co, Ni, Fe, Cr, Zn, and Ta, and x is from 0.01 to 0.1) or $Li_2Mn_3MO_8$ (wherein M may be selected from Fe, Co, Ni, Cu, and Zn); a lithium manganese oxide ($LiMn_2O_4$) with partial substitution of lithium by alkali earth metal ions; a disulfide compound; or an iron molybdenum oxide such as $Fe_2(MoO_4)_3$; or a combination thereof. For example, the positive active material may be $LiCoO_2$, $LiNiO_2$, $LiMn_2O_4$, $LiFePO_4$, or a combination thereof.

In lithium batteries, the negative active material is not particularly limited, and any suitable lithium battery negative active material may be used. The negative active material may include an alkali metal (e.g., lithium, sodium, or potassium), an alkaline earth metal (e.g., calcium, magnesium, or barium) and/or a certain transition metal (e.g., zinc), an alloy thereof, or a combination thereof. In particular, the negative active material may include lithium a lithium alloy, or a combination thereof. Lithium metal may be used as a negative active material. When lithium metal is used as a negative active material, a current collector may be omitted. Therefore, the volume and weight occupied by the current collectors may decrease, and thus, energy density per unit weight of the electrochemical device 100 may be improved. An alloy of lithium metal and another negative active material may be used as a negative active material. The other negative active material may be a metal alloyable with lithium. Examples of the metal alloyable with lithium include Si, Sn, Al, Ge, Pb, Bi, Sb, a Si—Y alloy (wherein Y is an alkali metal, an alkaline earth metal, a Group 13 element, a Group 14 element, a transition metal, a rare earth element, or a combination thereof, and Y is not Si), a Sn—Y alloy (wherein Y is an alkali metal, an alkaline earth-metal, a Group 13 element, a Group 14 element, a transition metal, a rare earth element, or a combination thereof, and Y is not Sn), or a combination thereof. Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. For example, the lithium alloy may include a lithium aluminum alloy, a lithium silicon alloy, a lithium tin alloy, a lithium silver alloy, a lithium lead alloy, or a combination thereof.

In lithium batteries, the solid electrolyte included in the electrolyte layer 120 is not particularly limited, and any suitable solid electrolyte available in the art may be used. The solid electrolyte may include $BaTiO_3$, $Pb(Zr,Ti)O_3$ ("PZT"), $Pb_{1-x}La_xZr_{1-y}Ti_yO_3$ ("PLZT") (wherein $0 \leq x<1$ and $0 \leq y<1$), $PB(Mg_3Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$, and $0<y<3$), lithium aluminum titanium phosphate ($Li_xAl_yTi_z(PO_4)_3$, wherein $0<x<2$, $0<y<1$, and $0<z<3$), $Li_{1+x+y}(Al, Ga)_x(Ti, Ge)_{2-x}Si_yP_{3-y}O_{12}$ (wherein $0 \leq x \leq 1$ and $0 \leq y \leq 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitrate ($Li_xN_y$, wherein $0<x<4$ and $0<y<2$), lithium phosphate oxynitrate (LiPON, $Li_xPON_y$, wherein $0<x<4$ and $0<y<2$), $SiS_2$ type glass ($Li_xSi_yS_z$, wherein $0<x<3$, $0<y<2$, and $0<z<4$), $P_2S_5$ type glass ($Li_xP_yS_z$, wherein $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, garnet-based ceramic, $Li_{3+x}La_3M_2O_{12}$ (wherein M=Te, Nb, or Zr), or a combination thereof. In some embodiments, the solid electrolyte may be LiPON.

Referring to FIGS. 11A to 11F, a method of manufacturing an electrochemical device 100, according to one or more embodiments, may include disposing the plurality of positive electrodes 102 on the positive electrode current collector 101 in a vertical direction and spaced apart from one another in a horizontal direction. The disposing of the plurality of positive electrodes 102 may include disposing a plurality of positive active materials to form a reversible layer 102d, and disposing, on the plurality of positive active materials forming the reversible layer 102d, a layer of a compound containing an active metal and having an initial charge and discharge efficiency lower than that of a positive active material to form an irreversible layer 102c. The method of manufacturing an electrochemical device 100 may include disposing a plurality of positive active materials to form the reversible layer 102d; disposing, on the plurality of positive active materials forming the reversible layer 102d, the layer of a compound containing an active metal to form the irreversible layer 102c; disposing the electrolyte layer 120 on the layer of a compound containing an active metal forming the irreversible layer 102c; and disposing the negative electrode current collector layer 111 on the electrolyte layer 120.

Alternatively, the electrochemical device 100 may be manufactured using the module 106 including the plurality of positive active materials forming the reversible layer 102d. The method of manufacturing an electrochemical device 100 may include preparing the module 106 including the plurality of positive active materials forming the reversible layer 102d; disposing the module 106 on the positive electrode current collector 101; disposing, on the module 106, the layer of a compound containing an active metal to form the irreversible layer 102c; disposing the electrolyte layer 120 on the layer of a compound containing an active metal forming the irreversible layer 102c; and disposing the negative electrode current collector layer 111 on the electrolyte layer 120. When the module 106 includes the compound containing an active metal, the disposing, on the module 106, of the layer of a compound containing an active metal, may be omitted.

Figure 11A:
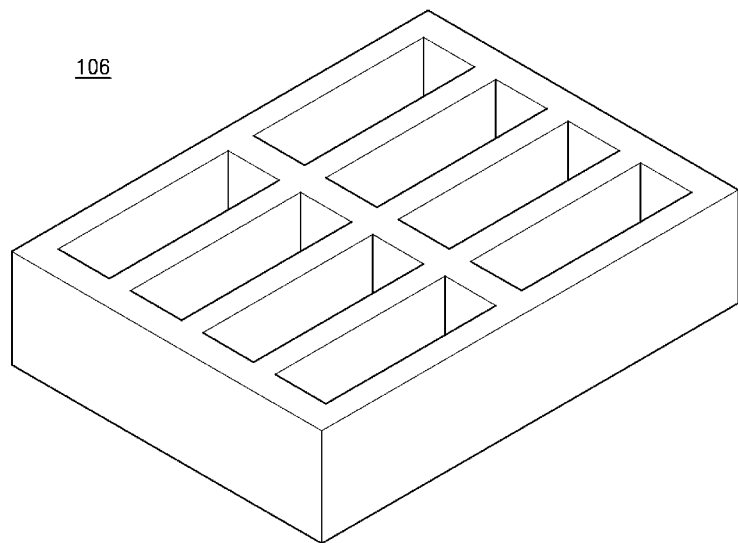
FIG. 11A illustrates a perspective view showing a part of a method of manufacturing an electrochemical device.

Referring to FIG. 11A, the module 106 including a plurality of positive electrodes may be prepared.

Figure 11B:
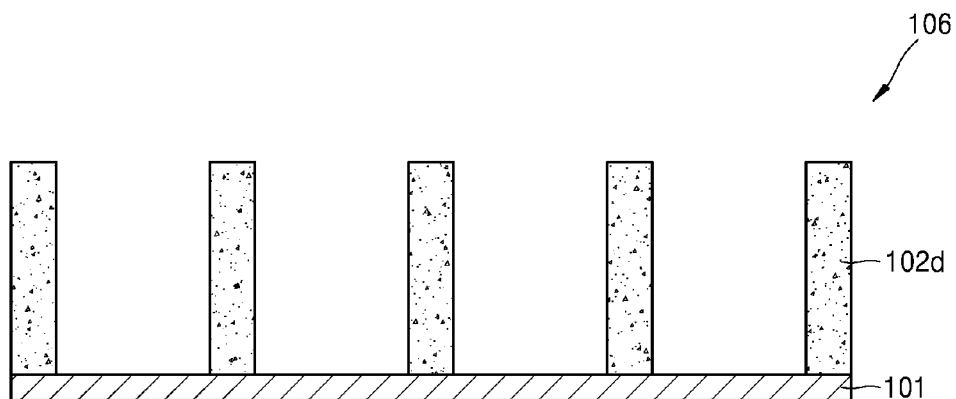
FIGS. 11B to 11F are cross-sectional views showing steps in the method of manufacturing an electrochemical device.

Referring to FIG. 11B, the positive electrode current collector 101 may be disposed on the module 106, or alternatively, the module may be disposed on the positive current collector 101. Although not illustrated in the drawings, the positive electrode current collector 101 may be attached to the module 106 using a conductive adhesive and/or a conductive paste.

Figure 11C:
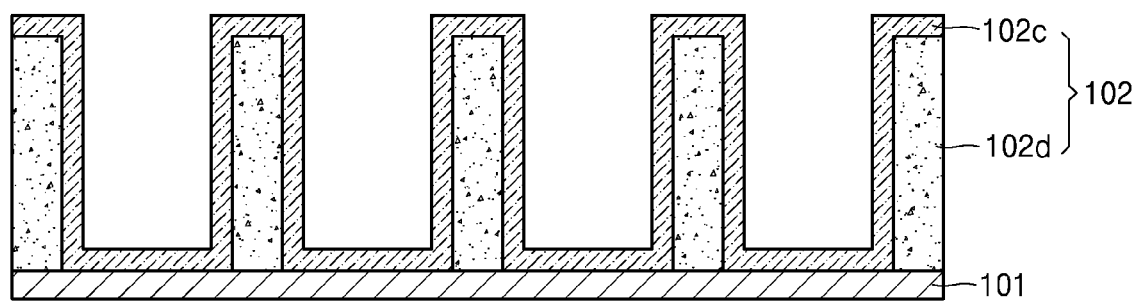

Referring to FIG. 11C, the layer of a compound containing an active metal and having an initial charge and discharge efficiency lower than that of a positive active material may be disposed on the module 106. The layer of a compound containing an active metal may be disposed by deposition, but embodiments are not limited thereto. Any suitable method may be used. For example, the deposition method may be chemical vapor deposition (CVD) or PVD. The compound containing an active metal may be $Li_3N$, but is not limited thereto. Any suitable compound containing an active metal and having an initial charge and discharge efficiency lower than an initial charge and discharge efficiency of the positive active material may be used. The positive electrode 102 may include the irreversible layer 102c including the compound containing an active metal and the reversible layer 102d including a positive active material.

Figure 11D:
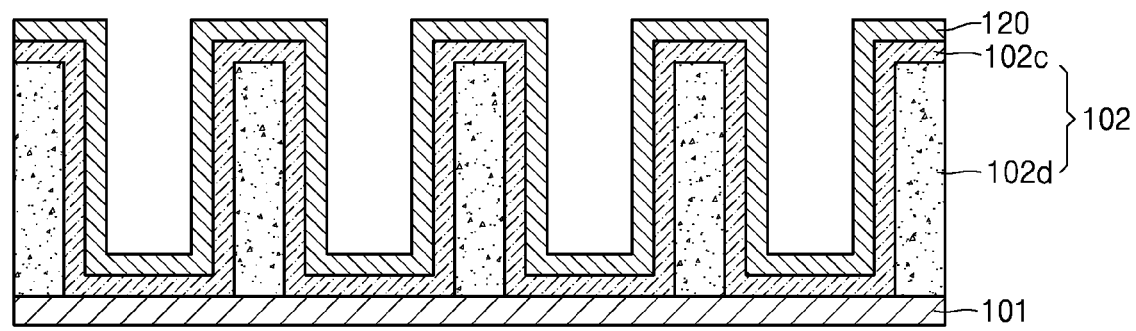

Referring to FIG. 11D, the electrolyte layer 120 may be disposed on the positive electrode 102. The electrolyte layer 120 may be disposed by deposition, but embodiments are not limited thereto. Any suitable method capable of disposing the electrolyte layer 120 on the positive electrode 102 may be used. For example, the method of depositing the electrolyte layer 120 may be CVD or PVD.

Figure 11E:
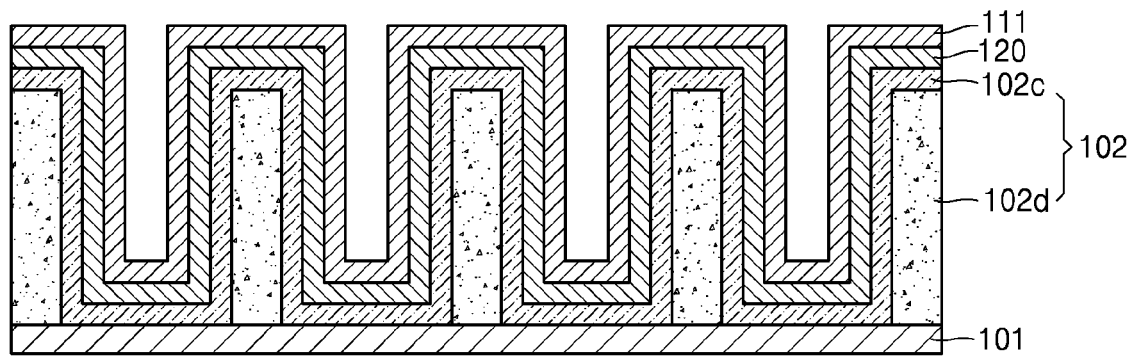

Referring to FIG. 11E, the negative electrode current collector layer 111 may be disposed on the electrolyte layer 120 to prepare the electrochemical device 100. The negative electrode current collector layer 111 may be disposed by deposition, but embodiments are not limited thereto. Any suitable method that can be used to dispose the negative electrode current collector layer 111 may be used. In some embodiments, the method of depositing the negative electrode current collector layer 111 may be thermal evaporation.

Figure 11F:
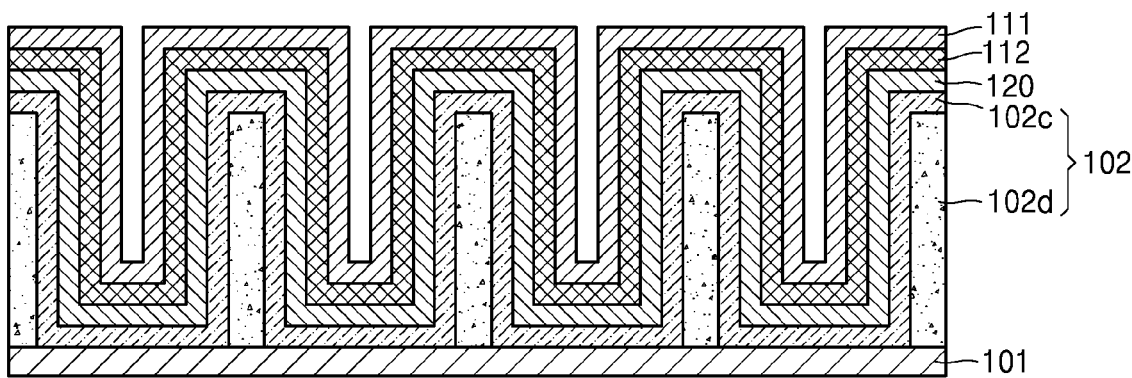

Referring to FIG. 11F, the negative electrode 112 may be formed between the electrolyte layer 120 and the negative electrode current collector layer 111. The negative electrode 112 may be Li metal, but embodiments are not limited thereto. Any suitable negative active material may be used as the negative electrode 112. As described above, the negative electrode 112 may be formed from the irreversible layer 102c upon initial charging and discharging. In some embodiments, the negative electrode 112 may be formed after the formation of the electrolyte layer 120 illustrated in FIG. 11D, and before the formation of the negative electrode current collector layer 111 illustrated in FIG. 11E.

As apparent from the foregoing description, according to one or more embodiments, a negative electrode current collector layer having a three-dimensional structure may relieve stress due to volume changes during charging and discharging of an electrochemical device. Further, a positive electrode that includes a compound having a relatively low initial charge and discharge efficiency may improve the uniformity of a thickness of the (lithium) negative electrode. Accordingly, a decrease in capacity and collapse of the structure of the electrochemical device may be prevented.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electrochemical device comprising:
a positive electrode current collector;
a first protruding portion comprising a plurality of positive electrodes in electrical contact with the positive electrode current collector, and a first dented portion disposed between each positive electrode of the plurality of positive electrodes;
an electrolyte layer comprising a second protruding portion and a second dented portion respectively disposed on the first protruding portion comprising the plurality of positive electrodes and the first dented portion disposed between each positive electrode of the plurality of positive electrodes; and
a negative electrode current collector layer comprising a third protruding portion and a third dented portion respectively disposed on the second protruding portion and the second dented portion of the electrolyte layer,
wherein the negative electrode current collector layer comprises an electrically conductive metal comprising at least one of copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), palladium (Pd), or a combination thereof.

2. The electrochemical device of claim 1, wherein, in the negative electrode current collector layer, the third protruding portion and the third dented portion are regularly arranged and are disposed parallel to each other.

3. The electrochemical device of claim 1, wherein, in the negative electrode current collector layer, the third protruding portion and the third dented portion are periodically arranged and are disposed parallel to each other.

4. The electrochemical device of claim 1, wherein, in the negative electrode current collector layer, the third dented portion comprises a bottom surface, a first side surface and a second side surface, wherein the first side surface and the second side surface are spaced apart from and facing each other, and wherein an angle between each of the first side surface and the second side surface and the bottom surface is about 60 degrees or greater.

5. The electrochemical device of claim 4, wherein a distance between the first side surface and the second side surface facing each other is in a range of about 5 micrometers to about 30 micrometers, and a depth of the third dented portion is in a range of about 60 micrometers to about 300 micrometers.

6. The electrochemical device of claim 1, wherein a thickness of the negative electrode current collector layer is about 5 micrometers or less.

7. The electrochemical device of claim 1, wherein the third protruding portion is electrically connected to the third dented portion of the negative electrode current collector layer.

8. The electrochemical device of claim 7, wherein, electrical connection between the third protruding portion and the third dented portion of the negative electrode current collector layer is maintained after about 100 or more cycles of charging and discharging.

9. The electrochemical device of claim 1, wherein each positive electrode of the plurality of positive electrodes comprises a compound comprising an active metal or an oxidation product thereof.

10. The electrochemical device of claim 9, wherein an initial charge and discharge efficiency of the compound comprising the active metal is about 50% or less.

11. The electrochemical device of claim 9, wherein the compound comprising the active metal comprises $Li_3N$, $Li_2NiO_2$, $Li_2MnO_3$, or a combination thereof.

12. The electrochemical device of claim 1, wherein each positive electrode of the plurality of positive electrodes comprises an irreversible layer in contact with the electrolyte layer and a reversible layer in contact with the positive electrode current collector,
wherein the reversible layer comprises a positive active material and the irreversible layer comprises a compound comprising an active metal or an oxidation product thereof, wherein an initial charge and discharge efficiency of the compound comprising the active metal is less than an initial charge and discharge efficiency of the positive active material.

13. The electrochemical device of claim 12, wherein a thickness of the irreversible layer is 200 nanometers or less.

14. The electrochemical device of claim 1, further comprising a module comprising the plurality of positive electrodes.

15. The electrochemical device of claim 14, wherein the module comprises a barrier rib in contact with the plurality of positive electrodes.

16. The electrochemical device of claim 15, wherein a composition of the barrier rib differs from a composition of each positive electrode of the plurality of positive electrodes.

17. The electrochemical device of claim 1, comprising a negative electrode disposed between the negative electrode current collector layer and the electrolyte layer.

18. The electrochemical device of claim 17, wherein the negative electrode is a conformal layer which conforms to a contour of the electrolyte layer.

19. The electrochemical device of claim 17, wherein a side step coverage of the negative electrode is about 50% or greater.

20. The electrochemical device of claim 17, wherein the negative electrode is an active metal layer.

21. An electrochemical device comprising:
a positive electrode current collector;
a plurality of positive electrodes in contact with the positive electrode current collector;
an electrolyte layer in contact with the plurality of positive electrodes; and
a negative electrode current collector layer disposed along a contour of a surface of the electrolyte layer, wherein the negative electrode current collector layer comprises a protruding portion and a dented portion each of which is disposed on and conforms to the contour of the surface of the electrolyte layer; and
a negative electrode disposed between the electrolyte layer and the negative electrode current collector layer and wherein the negative electrode and the negative electrode current collector are made of different materials.

22. The electrochemical device of claim 21, wherein the dented portion of the negative electrode current collector layer is electrically connected to the protruding portion of the negative electrode current collector layer.

23. The electrochemical device of claim 21, wherein, in the negative electrode current collector layer, the protruding portion and the dented portion are regularly or periodically arranged and are disposed parallel to each other.

24. The electrochemical device of claim 21, wherein the negative electrode is disposed along the contour of the surface of the electrolyte layer.

25. The electrochemical device of claim 24, wherein the positive electrode comprises a positive active material and a compound comprising an active metal or an oxidation product thereof, wherein an initial charge and discharge efficiency of the compound comprising the active metal is lower than an initial charge and discharge efficiency of the positive active material.

26. An electrochemical device comprising:
a positive electrode current collector;
a positive electrode in contact with the positive electrode current collector and comprising a positive active material and a compound comprising an active metal, wherein an initial charge and discharge efficiency of the compound comprising the active metal is lower than an initial charge and discharge efficiency of the positive active material;
an electrolyte layer in contact with the positive electrode; and
a negative electrode current collector layer, wherein the entire length of the negative electrode current collector layer is in contact with the electrolyte layer.

27. The electrochemical device of claim 26, wherein an initial charge and discharge efficiency of the compound comprising the active metal is about 50% or less.

28. The electrochemical device of claim 26, wherein the compound comprising the active metal comprises $Li_3N$, $Li_2NiO_2$, $Li_2MnO_3$, or a combination thereof.

29. The electrochemical device of claim 26, wherein the positive electrode comprises an irreversible layer in contact with the electrolyte layer and a reversible layer in contact with the positive electrode current collector,
the irreversible layer comprises the compound comprising the active metal, and
the reversible layer comprises the positive active material.

30. The electrochemical device of claim 29, wherein a thickness of the irreversible layer is 200 nanometers or less.

31. The electrochemical device of claim 29, wherein the irreversible layer further comprises an oxidation product of the compound comprising the active metal.

* * * * *